INVENTOR.
Raymond C. Posh

United States Patent Office 3,449,971
Patented June 17, 1969

3,449,971
LINEAR ACTUATOR
Raymond C. Posh, Livonia, Mich., assignor to Lear Siegler, Inc., Santa Monica, Calif., a corporation of Delaware
Filed June 12, 1967, Ser. No. 645,270
Int. Cl. F16h 29/20, 29/02, 27/02
U.S. Cl. 74—89.15     9 Claims

ABSTRACT OF THE DISCLOSURE

An actuator including a threaded shaft with one wheel-like member rotatably supported in a housing and in threaded engagement with the shaft and another wheel-like member rotatably supported in the housing and in splined relationship with the shaft so as to rotate with the shaft while allowing relative movement therebetween axially of the shaft. There is also included means for causing relative rotation between the wheel-like members whereby a small force moved over a large distance on the input to the actuator is connected to a large force moved over a very small distance at the output of the actuator.

---

There are various actuators known in the prior art which, when provided with a rotary input, provide a linear output. However, there are various requirements for a compact very high ratio linear actuator which is not provided by the prior art actuators.

Accordingly, it is an object and feature of this invention to provide a new and novel high ratio linear actuator which is extremely compact.

Another object and feature of this invention is to provide an actuator having a rotary input and a linear output divisible into very or infinitely small increments of movement.

A further object and feature of this invention is to provide a new and novel linear actuator which, in accordance with the physical laws of work, changes a force of a relatively small magnitude moved over a large distance on the input side to a much larger force applied over a very small distance on the output side.

In general, these and other objects and features may be attained in a preferred embodiment of the instant invention which includes a housing with a threaded shaft extending through the housing. A first wheel-like means threadedly coacts with the shaft and a second wheel-like means is splined with the shaft for rotation therewith while allowing relative movement therebetween axially relative to the shaft. An input means operatively coacts with the first and second wheel-like members for providing relative movement between the first and second wheel-like members so that the shaft moves axially. In one preferred embodiment, the wheel-like members are first and second worm gears with a different number of teeth thereabout and the input means is a worm coacting with the two worm gears. In another preferred embodiment, the two wheel-like members are juxtaposed and present inclined surfaces which are at different angles of inclination and the input means includes a belt having a circular cross section and engaging the inclined surfaces at different distances from the axis of the shaft.

Other objects and attendant advantages of the present invention will be readily appreciated as the same becomes better understood by reference to the following detailed description when considered in connection with the accompanying drawings wherein.

Referring now to the drawings, wherein like numerals indicate like or corresponding parts, a preferred embodiment of the actuator is generally shown at 10.

Figure 1:
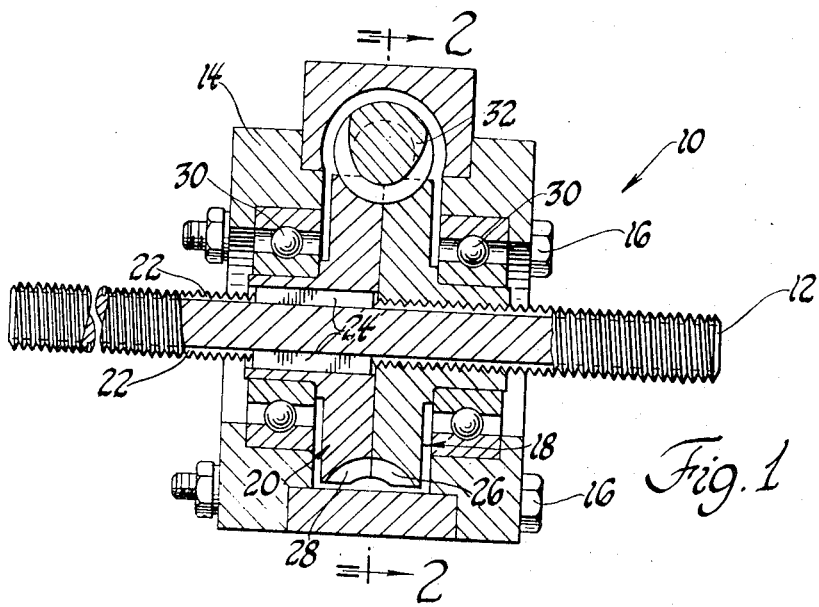
FIGURE 1 is a cross-sectional view of a preferred embodiment of the instant invention.

The actuator 10 includes a threaded shaft 12 which is disposed in the housing 14. The housing 14 includes various components which are held together by the bolts 16.

There is included a first means 18 threadedly coacting with the shaft 12 and a second means 20 which coacts with the shaft 12 for rotating with the shaft 12 while allowing the shaft 12 to move axially relative thereto. More specifically, the first means 18 includes a first circular worm gear member and the second means 20 includes a second circular worm gear member. The second worm gear member 20 is splined to the shaft 12 by way of the grooves 22 extending along the shaft 12 on diametrically opposite sides thereof and keys 24. The keys 24 interconnect the gear 20 and the shaft 12.

The first and second gears 18 and 20 define respective halves of a worm gear and each half has a different number of teeth thereabout. That is, the gear 18 has a different number of teeth 26 than the number of teeth 28 about the gear 20.

The respective gears 18 and 20 are rotatably supported in the housing 14 through the bearings 30.

There is also included an input means operatively coacting with the first and second gears 18 and 20 for providing a relative movement between the gears 18 and 20 to move the shaft 12 axially. More specifically, the input means comprises a worm 32 which coacts with the gears 18 and 20 for rotating the gears 18 and 20. The worm 32 is secured to the input shaft 34 so that upon rotation of the input shaft 34, the worm 32 rotates.

In operation, the shaft 34 is rotated to rotate the worm 32 and the worm 32 is in meshing engagement with the gears 18 and 20 to rotate the gears 18 and 20. As the gear 20 is rotated, the shaft 12 is rotated therewith; however, because the gears 18 and 20 have a different number of teeth thereon, there is a relative rotation between the gears 18 and 20 which in turn causes a relative rotation between the gear 18 and the shaft 12. Upon relative rotation between the gear 18 and the shaft 12, the threaded engagement therebetween causes the shaft 12 to move axially relative to the gear 18.

Figure 2:
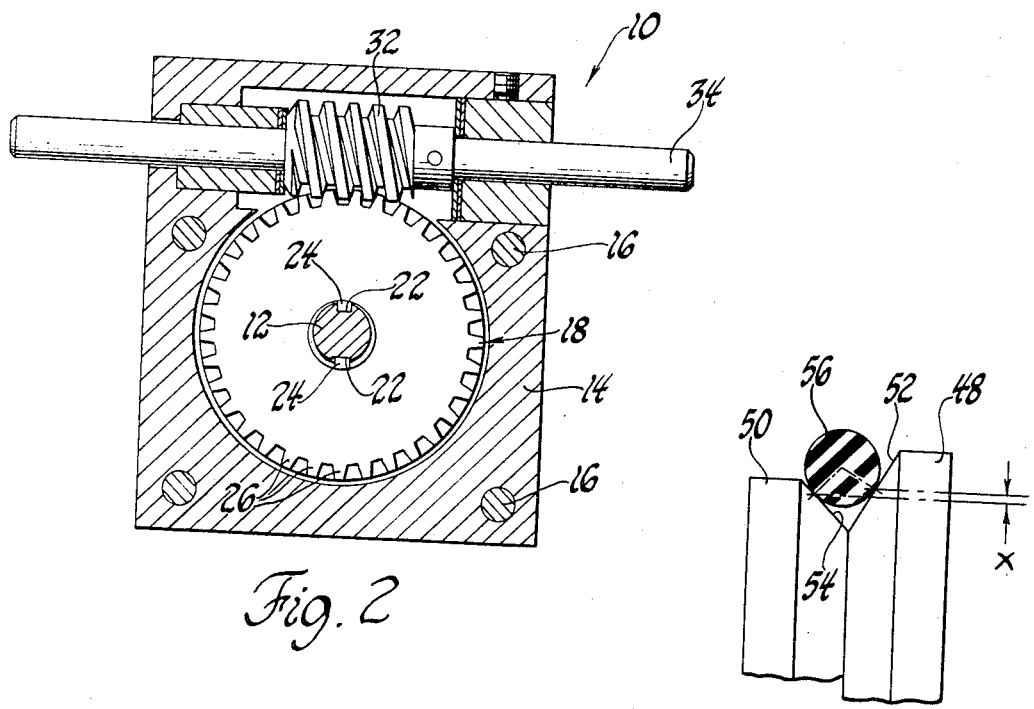
FIGURE 2 is a cross-sectional view taken substantially along line 2—2 of FIGURE 1.

A sample of the embodiment illustrated in FIGURES 1 and 2 which has been fabricated and tested includes a standard worm gear 20 having thirty-two (32) teeth, a pressure angle of 14½°, a pitch diameter of two (2.0) inches, and a diametral pitch of sixteen (16). Such a gear was cut or hobbed from a cutting worm which has the same parameters as the worm 32; to wit, a pitch of sixteen (16), a 14½° pressure angle, a single thread, and a 0.625 inch pitch diameter. Accordingly, the distance between the axis of rotation of the worm 32 and the axis of rotation of the gear 20 (i.e., the axis of the shaft 12) equals 1.3125 inches, i.e., total of pitch diameters divided in half.

The gear 18, however, is a non-standard gear having thirty-one (31) teeth. The gear 18 is made by cutting the teeth 26 therein with the same or identical cutting worm as utilized to cut the teeth 28 in the gear 20. When the teeth are cut into the gear 18, however, the ratio of the running speed between the cutting worm and the gear 18 is such to provide thirty-one (31) teeth on the gear 18. Normally, the hobbing would result in each of the thirty-one (31) teeth 26 being slightly larger than the respective teeth 28 on the gear 20 and the cut would extend farther into the gear 18. The cutting or the hobbing however is ceased at a point where the depth of the cut into the gear 18 is the same as the depth of the cut into the gear 20. The gear 18 meshes with the worm 32 having a 0.625 inch pitch diameter. In this sample, the worm 32 must rotate thirty-two times in order for the gear 20 to rotate once. Thus, the ratio between the worm 32 and the gear 20 is thirty-two to one (32:1). Likewise, the ratio between the worm 32 and the gear 18 is thirty-one to one (31:1). In other words, the worm 32 must rotate thirty-one times to rotate the gear 18 once. Thus, each time the worm 32 rotates thirty-one revolutions, the gear 18 rotates once, but the gear 20 rotates $31/32$ of a revolution. Therefore, upon thirty-one revolutions of the worm 32, there is a differential rotation between the gears 18 and 20 of $1/32$ of a revolution. Thus, this must be repeated thirty-two (32) times to accomplish one complete relative revolution between the gears 18 and 20. Upon one complete relative revolution between the gear 18 and the gear 20, there occurs, therefore, a complete relative revolution between the gear 18 and the shaft 12. The ratio for the sample assembly, therefore, is thirty-one times thirty-two, or nine hundred and ninety two to one (31 x 32, or 992:1). In other words, the worm 32 must rotate nine hundred and ninety two (992) revolutions to accomplish an axial movement of the shaft 12 which is equal to its circular pitch, i.e., the distance between corresponding points of adjacent threads.

Of course, it will be understood that the ratio of the assembly may be varied by increasing or decreasing the number of threads on the worm 32, by increasing or decreasing the number of threads on the shaft 12, or by changing the number of teeth on the gears 18 and 20.

Upon rotation of the worm 32, therefore, the shaft 12 moves a very small distance so that the actuator may be used for very precise movements. Additionally, a very small torque on the shaft 34 to rotate the worm 32 results in a great deal of force applied by the shaft 12 as it moves axially a very small distance.

Figure 3:
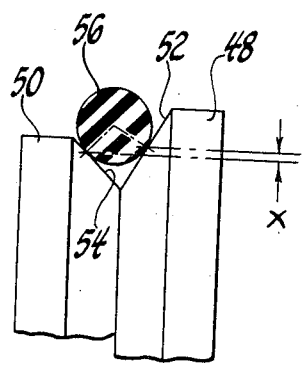
FIGURE 3 is a fragmentary view of an alternative embodiment of the instant invention.

An alternative embodiment is disclosed in FIGURE 3, where instead of utilizing worm gears, circular members 48 and 50 are juxtaposed to one another and present inclined surfaces 52 and 54 which are at different angles of inclination relative to the axis of rotation. The input means comprises a belt 56 having a circular cross section and engaging the respective inclined surfaces 52 and 54 at different distances from the axis of the shaft or the axis of rotation. More specifically, the difference in the distances of contact between the belt 56 and the respective inclined surfaces 52 and 54 is indicated by the distance X in FIGURE 3. Due to the difference X, the belt 56 will rotate both the members 48 and 50; however, one of the members will rotate relative to the other. Thus, if one of the members 48 or 50 is threaded to a shaft and the other is splined to a shaft in the manner similar to the gears 18 and 20, the shaft will move axially upon rotation thereof.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than specifically described.

The embodiments of the invention in which an exclusive property or privilege is claimed are defined as follows:

1. An actuator comprising: a threaded shaft, first means threadedly coacting with said shaft, second means coacting with said shaft for rotating said shaft while allowing said shaft to move axially relative thereto, and a single input means simultaneously coacting with said first and second means for providing a relative movement between said first and second means to move said shaft axially.

2. An actuator as set forth in claim 1 wherein said second means is splined to said shaft.

3. An actuator as set forth in claim 2 wherein said first means includes a first circular member and said second means includes a second circular member and said input means coacts therewith to rotate said circular members at different rotational speeds.

4. An actuator as set forth in claim 3 wherein said circular members are juxtaposed and present inclined surfaces which are at different angles of inclination and said input means comprises a belt engaging the respective inclined surfaces at different distances from the axis of said shaft.

5. An actuator as set forth in claim 3 wherein said circular members are juxtaposed gears having respectively different numbers of teeth thereabout.

6. An actuator as set forth in claim 5 wherein said gears define respective halves of a worm gear with each half having a different number of teeth thereabout, and said input means comprises a worm in meshing engagement with said gears.

7. An actuator comprising a threaded shaft, first means threadedly coacting with said shaft, second means coacting with said shaft to prevent relative rotation therebetween while allowing relative movement therebetween axially of said shaft, and a single means simultaneously coacting with said first and second means so that upon operation of said actuator said first means rotates relative to said second means.

8. An actuator as set forth in claim 7 wherein said first means comprises one half of a worm gear and said second means comprises the other half of a worm gear and one of said halves includes more teeth than the other.

9. An actuator as set forth in claim 8 wherein said means coacting with said first and second means comprises a worm.

References Cited

UNITED STATES PATENTS

| | | | |
|---|---|---|---|
| 2,001,180 | 5/1935 | Buckner | 74—802 |
| 2,520,014 | 8/1950 | Rehnberg et al. | |
| 2,630,022 | 3/1953 | Terdina. | |
| 2,930,587 | 3/1960 | Seawright | 77—34.4 |

FRED C. MATTERN, Jr., *Primary Examiner.*

F. D. SHOEMAKER, *Assistant Examiner.*

U.S. Cl. X.R.

74—89.14, 230.17, 424.8, 425